(12) United States Patent
Shrader

(10) Patent No.: US 6,272,531 B1
(45) Date of Patent: Aug. 7, 2001

(54) METHOD AND SYSTEM FOR RECOGNIZING AND ACTING UPON DYNAMIC DATA ON THE INTERNET

(75) Inventor: Theodore Jack London Shrader, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/052,334

(22) Filed: Mar. 31, 1998

(51) Int. Cl.[7] .............................. G06F 15/16; G05B 19/02
(52) U.S. Cl. ...................... 709/206; 709/217; 340/825.26
(58) Field of Search ................................... 709/206, 207, 709/229, 217, 218, 245; 340/825.06, 825.07, 825.26, 825.27; 379/92.01, 92.02, 93.23, 93.24; 707/501, 513, 10, 530

(56) References Cited

U.S. PATENT DOCUMENTS

| | | | |
|---|---|---|---|
| 4,554,418 | * 11/1985 | Toy | 379/88.01 |
| 4,839,853 | * 6/1989 | Deerwester et al. | 707/5 |
| 5,036,334 | * 7/1991 | Henderson et al. | 342/460 |
| 5,270,922 | * 12/1993 | Higgins | 705/37 |
| 5,297,249 | * 3/1994 | Bernstein et al. | 345/356 |
| 5,426,422 | * 6/1995 | Vanden Heuvel et al. | 340/825.27 |
| 5,446,891 | * 8/1995 | Kaplan et al. | 707/2 |
| 5,499,196 | * 3/1996 | Pacheco | 702/81 |
| 5,535,428 | * 7/1996 | King et al. | 455/38.4 |
| 5,621,892 | * 4/1997 | Cook | 709/224 |
| 5,640,682 | * 6/1997 | Wagai et al. | 455/38.2 |
| 5,705,995 | * 1/1998 | Freeburg et al. | 331/14 |
| 5,761,662 | * 6/1998 | Dasan | 707/10 |
| 5,764,142 | * 6/1998 | Anderson et al. | 340/811 |
| 5,774,052 | * 6/1998 | Hamm et al. | 340/540 |
| 5,774,668 | * 6/1998 | Choquier et al. | 709/223 |

(List continued on next page.)

OTHER PUBLICATIONS

Berst, Jesse, "What's Wrong With Today's Push Technology", ZDNet Berst Alert, pp. 1–3, Apr. 1997.*
Arnold, S. E. et al. "Push Technology: Driving Traditional Online into a Corner", onlineinc.com, pp. 1–13, Aug. 1997.*
Konana, P. et al. "Implementation and Performance Evaluation of Real–Time E–Brokerage System", IEEE Real–Time Systems Symposium, pp. 109–118, Nov. 2000.*
Berghel, Hal, "Cyberspace 2000: Dealing with Information Overload", Communications of the ACM, pp. 19–24, Feb. 1997.*
Gerwig, Kate, "The Push Technology Rage . . . So What's Next?", Business: the 8th Layer, pp. 13–17, Jul. 1997.*
Ladd, Eric, "Platinum Ed. Using HTML4.0, Java1.1, and JavaScript 1.2, Sec. Ed.", Que, Macmillan Computer Pub, excerpt pp. 1–5, Feb. 1998.*

* cited by examiner

Primary Examiner—Zarni Maung
Assistant Examiner—Jason D. Cardone
(74) Attorney, Agent, or Firm—Duke W. Yee; Jeffrey S. LaBaw

(57) ABSTRACT

A method for recognizing and acting upon dynamic data in a computer network such as the Internet. The method begins by having the user (at a machine connected to the computer network) define at least one data source that he or she is interested in monitoring. The data source includes information identifying a location (i.e. a URL) of the data object to be monitored, together with recognition criteria which determines whether the data source is valid. For each data source, the user may then define a set of one or more action criteria, wherein each action criteria has a given polling interval and includes information identifying a sensitivity criteria and an action to be taken if the sensitivity criteria for the data source is met. The inventive process retrieves one or more data sources from the Internet, examines the data sources according to the sensitivity criteria, and triggers actions if any of the sensitivity criteria are met.

21 Claims, 8 Drawing Sheets

U.S. PATENT DOCUMENTS

| | | | | |
|---|---|---|---|---|
| 5,790,793 | * | 8/1998 | Higley | 709/218 |
| 5,802,253 | * | 9/1998 | Gross et al. | 706/47 |
| 5,838,252 | * | 11/1998 | Kikinis | 340/825.44 |
| 5,839,097 | * | 11/1998 | Klausner | 702/188 |
| 5,844,498 | * | 12/1998 | Ide | 340/825.44 |
| 5,848,378 | * | 12/1998 | Shelton et al. | 702/3 |
| 5,889,477 | * | 3/1999 | Fastenrath | 340/905 |
| 5,900,801 | * | 5/1999 | Heagle et al. | 340/286.09 |
| 5,956,486 | * | 9/1999 | Hickman et al. | 709/206 |
| 5,956,487 | * | 9/1999 | Venkatraman et al. | 709/218 |
| 5,959,815 | * | 9/1999 | Gilbert | 361/1 |
| 5,978,828 | * | 11/1999 | Greer et al. | 709/224 |
| 5,991,799 | * | 11/1999 | Yen et al. | 709/218 |
| 6,018,699 | * | 1/2000 | Baron et al. | 702/3 |
| 6,021,419 | * | 2/2000 | Clark, Jr. et al. | 708/300 |
| 6,026,440 | * | 2/2000 | Shrader et al. | 709/224 |
| 6,038,601 | * | 3/2000 | Lambert et al. | 709/226 |
| 6,044,205 | * | 3/2000 | Reed et al. | 709/201 |
| 6,044,403 | * | 3/2000 | Gerszberg et al. | 709/225 |
| 6,055,570 | * | 4/2000 | Nielson | 709/224 |
| 6,065,044 | * | 5/2000 | Ogasawara | 709/207 |
| 6,073,163 | * | 6/2000 | Clark et al. | 709/203 |
| 6,081,200 | * | 6/2000 | Park | 340/825.44 |
| 6,087,956 | * | 7/2000 | Helferich | 340/825.44 |
| 6,088,707 | * | 7/2000 | Bates | 707/501 |
| 6,092,102 | * | 7/2000 | Wagner | 709/206 |
| 6,108,637 | * | 8/2000 | Blumenau | 705/7 |
| 6,115,393 | * | 9/2000 | Engel et al. | 370/469 |
| 6,119,078 | * | 9/2000 | Kobayakawa et al. | 704/3 |
| 6,195,097 | * | 11/1999 | Shrader et al. | 345/356 |

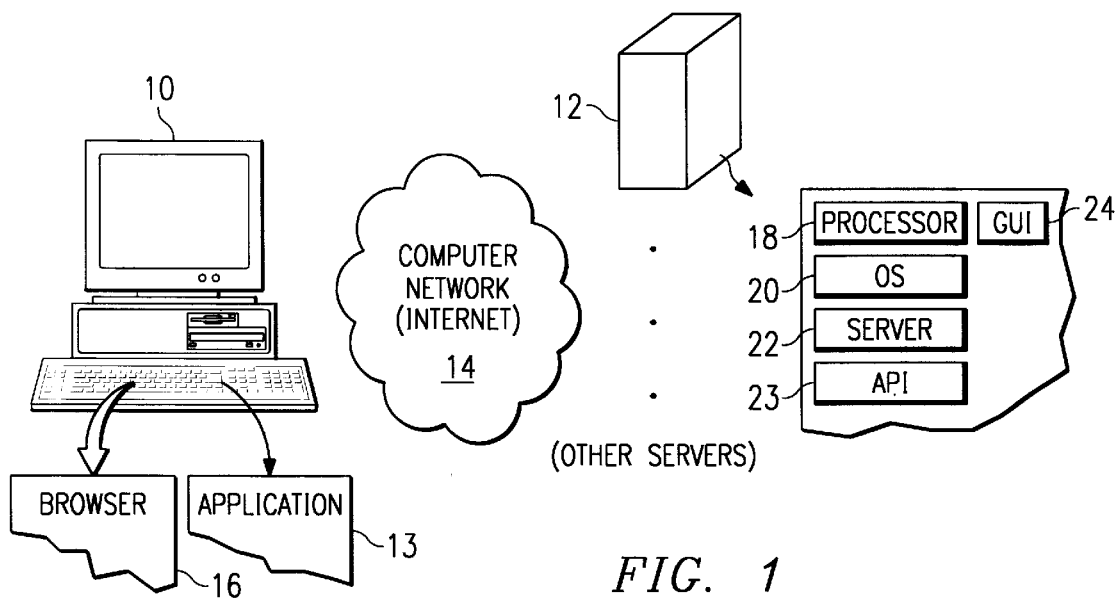
FIG. 1
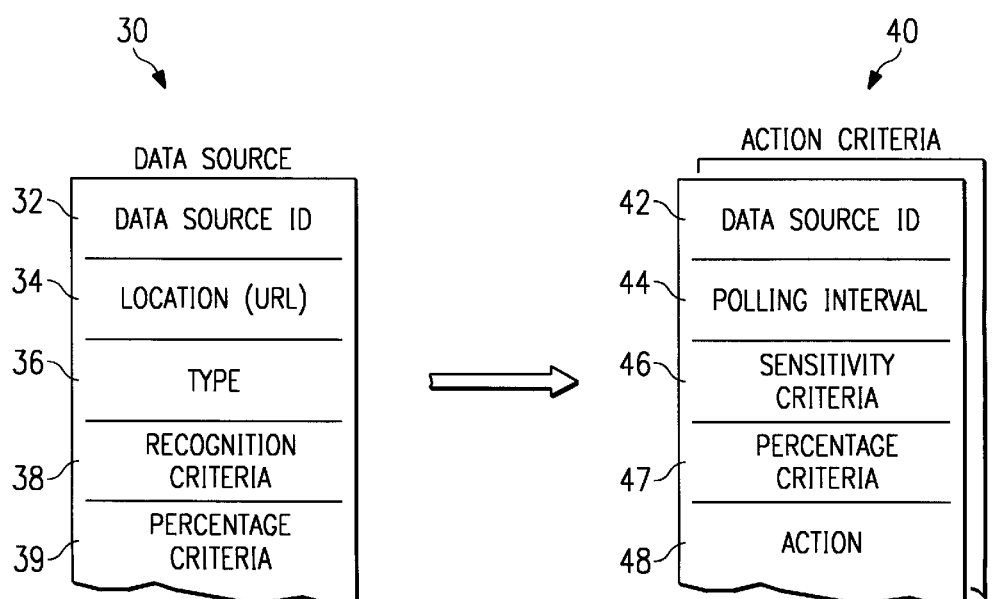
FIG. 2
FIG. 3

METHOD AND SYSTEM FOR RECOGNIZING AND ACTING UPON DYNAMIC DATA ON THE INTERNET

BACKGROUND OF THE INVENTION

1. Technical Field

The present invention relates generally to information retrieval in online computer networks and, in particular, to a method and system for recognizing dynamic data available on a computer network and triggering an action based on the changing state of the retrieved data.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server (sometimes referred to as a "Web site") identified in the link and, in return, receives in return a text document formatted according to HTML. The Web server can return many data object types (known as Multipurpose Internet Mail Extension (MIME) types), such as .gif and .jpeg files (graphics), .mpeg files (movies), .wav files (audio) and the like.

Thus, a user of a client machine typically "pulls" information from the Web using a Web browser. This process, however, assumes that the user can locate the information he or she desires at a particular time. Web content is constantly changing, and this fact has driven the development of so-called "push" technology. In a conventional "push" implementation, a user registers for information from a particular company or site and, from then on, the information is delivered to the user's machine when available or when the page has changed. Thus, information providers have more control over how their content is received and viewed.

Although such data delivery mechanisms have the advantage of enabling a user define what type of data he or she is interested in receiving, they have not found wide acceptance. One of the problems associated with pushing content to users in this manner is that the information is merely displayed to the user. Such known techniques do not afford the user the ability to specify when the information should be presented or how the information may be used. These systems simply display the changed data to the user.

It would be desirable to provide improved techniques for recognizing and acting upon dynamic data in a computer network such as the public Internet. The present invention addresses this problem.

SUMMARY OF THE INVENTION

It is an object of this invention to recognize dynamic data available on the Internet and trigger actions based on the changing state of such data.

It is a further object of this invention to implement a framework for recognizing and acting upon such dynamic data wherein sensitivity criteria allow for increases or decreases in the severity or nature of the actions triggered.

It is a further more specific object of this invention to cull data of different types from the Internet, apply a given heuristic to the data, and then act upon the data if a specified criteria is met by the data.

It is another more particular object of this invention to monitor dynamic data in a background process running on a machine connectable to the Internet and then effecting a given action defined by a user of the machine.

A still further object of this invention is to provide a simple mechanism for enabling a user of a Web client to specify exactly what type of information he or she desires to be notified about, and to define what type of action is to be taken upon a given occurrence with respect to such information.

Another object of this invention is to provide such a system whereby a user specifies the degree to which given content should change before a given action is taken.

These and other objects of the invention are provided by a method operative in a computer network for recognizing and acting upon dynamic data in a computer network such as the public Internet. The method begins by having the user (at a client machine) define at least one "data source" that he or she is interested in monitoring. The data source includes information identifying a location (i.e. a URL) of the data object to be monitored, together with recognition criteria which determines whether the data source is valid. Thus, for example, if the data source is a text string, the recognition criteria may be a string of words that must be present in the data source. For each data source, the user may then define a set of one or more "action criteria", wherein each action criteria has a given polling interval and includes information identifying a sensitivity criteria and an action to be taken if the sensitivity criteria for the data source is met.

The following functions then are carried out by a monitoring algorithm, typically running at the user's client machine. The algorithm has access to the data structures specified by the user. At the polling interval for a given action criteria, a determination is made (using the recognition criteria) as to whether the data source is valid. If so, a test is run to determine whether the defined sensitivity criteria is met. If the defined sensitivity criteria is met for a valid data source during the polling interval, the defined action is then taken. The particular action taken is user-defined and may include, without limitation, logging a message, sending an e-mail, transmitting a page (e.g., to the client or other network machine), running a program, updating a database, and the like.

The inventive method has particular utility where the client machine is a computer having a Web browser and the computer network is the public Internet. The process itself is preferably a Java application or applet (or more generally, a "computer program product") that executes in the background of the workstation that hosts the application, whether or not the particular user is connected online to the computer network. The process recognizes particular data source(s) defined by the user. In particular, the process parses the format of the MIME type returned, distinguishes characteristics of the data type, and determines if the data contents have changed. The application then acts upon dynamic data variations in a manner that is also defined by the user. Sensitivity criteria allow for adjustments in the severity or nature of the actions triggered. Typically, a particular data source may have a plurality of action criteria associated therewith.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a representative system in which the present invention is implemented;

FIG. 2 is a representative data structure template for a data source;

FIG. 3 is a representative data structure template for an action criteria associated with a particular data source;

DETAILED DESCRIPTION OF THE PREFERRED EMBODIMENT

Figure 4:
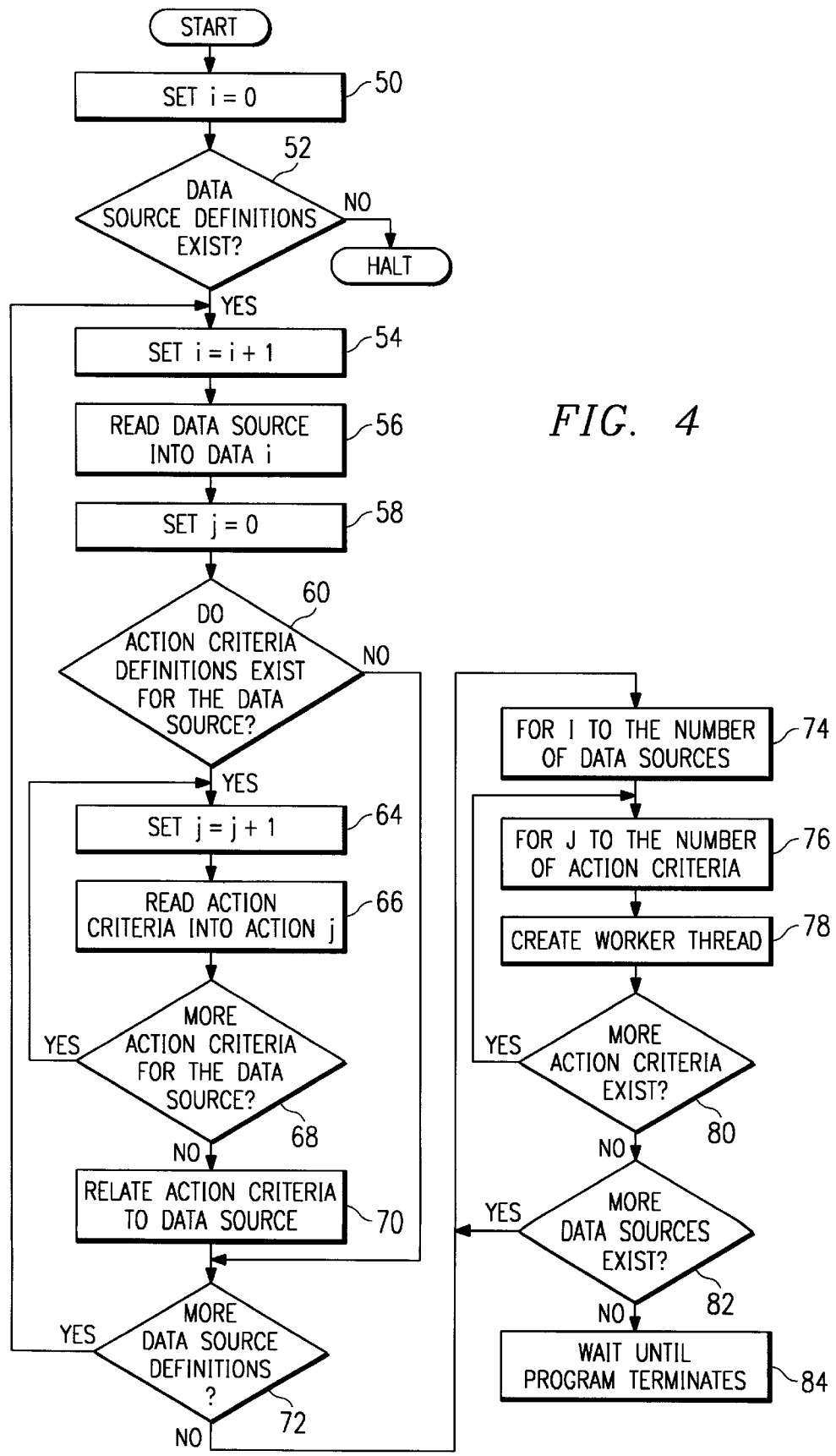
FIG. 4 is a flowchart of the basic processing algorithm of the present invention.

The present invention is preferably implemented in an Internet or Web-based computer network. Thus, by way of background, a representative Web client/Web server is illustrated in FIG. 1. In particular, a client machine 10 is connected to a Web server platform 12 via a communication channel 14. As will be described below, the inventive application 13 preferably has a "user interface" piece for enabling a user to define certain data structures, together with a process (which also preferably executes on the user's workstation) and that performs a monitoring algorithm. One or more of the Web servers (or so-called Web sites) provide one or more "data sources" to the inventive process as will be seen.

For illustrative purposes, channel 14 is the public Internet, an intranet, an extranet or any other known network connection. Web server platform 12 is one of a plurality of servers which are accessible by clients, one of which is illustrated by machine 10. A representative client machine may include a Web browser 16, which is a known software tool used to access the servers of the network. The Web server platform supports files in the form of hypertext documents, graphics and other data type objects. The network path to a server (or to a file on the server) is identified by a Uniform Resource Locator (URL), as is well-known.

A representative Web Server platform 12 comprises an IBM PowerPC® computer 18 running the AIX® Operating System 20 and a Web server program 22, such as Netscape Enterprise Server Version 3.51, that supports interface extensions. The platform 12 also includes a graphical user interface (GUI) 24 for management and administration, and an Application Programming Interface (API) 23 to enable application developers to extend and/or customize the core functionality thereof through software programs known as "plug-ins."

Although not required, the present invention is preferably implemented as a Java application (i.e. a set of Java program instructions or code) that is downloaded to or otherwise delivered to a machine (on a tangible medium) and installed in a known manner. Preferably, a user defines "data sources" and "action criteria" (as will be described below) and runs the monitoring algorithm on the user's workstation. One or more server machines in the network may support the application as well.

A representative Web client is a personal computer that is x86-, PowerPC®- or RISC-based, includes an operating system such as IBM® OS/2® or Microsoft Windows '95 or NT, as well as a browser, such as Netscape Communicator (any version) or Internet Explorer (any version), having native support for application plug-ins. The Web client machine is connectable to the Web server(s) via the Internet, an intranet or some other computer network. The Web client browser typically includes a Java Virtual Machine (JVM), which provides a convenient runtime environment for programs written as Java applications or applets. The JVM also includes an interpreter for executing Javascript code or the like and, thus, portions of the invention may be implemented in a scripting language if desired. As noted above, the invention is preferably implemented as a Java application or applet.

Although the Web client is typically a personal computer, this is not a requirement. The Web client may be any generalized "information appliance" having a processor, an operating system, optionally a browser application, and a means to connect the device to a computer network from which data may be retrieved. Such appliances include, without limitation, a handheld or palmtop device (e.g., running Windows CE 2.0 or higher), a diskless or so-called "network computer", a set-top computer terminal, or the like. The data structure definition function of the present invention may be implemented in any such device through a conventional user interface.

Generalizing, the present invention is a process that retrieves one or more data sources from the computer network such as the Internet, examines the data sources according to sensitivity criteria, and triggers actions if any of the sensitivity criteria are met. The process preferably runs on the user's client machine and makes use of a pair of data structures that are illustrated in FIGS. 2 and 3 and that are now described. These structures are merely exemplary.

Data Structures

As inputs to the background process, m data sources are defined, with each data source having n action criteria. The information that defines each data structure is typically defined by a user using a conventional graphical user interface dialog. Typically, the data structures are defined on the client machine, although this is not required. Thus, although not meant to be limiting, the user may be prompted to fill in an online form (using CGI scripting techniques) for each data structure characteristic defined below. Any convenient data entry technique may be used, however, since the data will be stored where the inventive application process can access it.

As illustrated in FIG. 2, each data source 30 preferably is defined by the following criteria:

Data source ID 32—an internally unique identifier for the data source;

Location 34—a URL where to access the data (such as http://server1/instrument.gif or http://server2//quotes.html, or the like);

Type 36—typically text or graphic, and if graphic, what type of graphic format. Other data types (e.g., audio, movie, etc.) may be supported as well. Thus, for example, the inventive background process has the ability to distinguish between graphic format types and parse the individual "pixels" stored in each format for the data source's recognition criteria or action criteria's sensitivity definition (as defined below);

Recognition criteria 38—information that defines how the background process can determine if the data source is legitimate. Thus, for text, this criteria may be a string of words that need to be part of the contents returned from the URL. For graphics, this criteria may be certain colored pixels located in specific coordinate areas. Other more sophisticated pattern matching algorithms could also be applied; and Percentage recognition 39—a percentage value that allows the user to specify some leeway in the event not all the recognition criteria have been met. The value controls the process to act like a fuzzy match.

FIG. 3 illustrates a template for each action criteria 40, which preferably is defined with the following information:

Data source ID 42—an identifier that uniquely defines which data source the action criteria is associated;

Polling interval 44—a time value that specifies how often the action criteria should be checked;

Sensitivity criteria 46—information similar to the data source's recognition criteria, but that acts as a triggering mechanism for the action to be taken;

Percentage sensitivity 47—a percentage value that allows the user to specify some leeway in the event not all the sensitivity criteria has been met. As with percentage recognition, this value controls the process to act like a fuzzy match.

Action to take 48—a user-defined action the background process should initiate if the sensitivity criteria for a data source is met. The action to take defines a type, such as logging a message, sending an e-mail, running a program, or updating a database, and the parameters needed to run the action, such as a file name or an e-mail address.

Background Process Algorithm

The inventive process uses user-supplied information in these data structures to recognize and act upon dynamic data available for retrieval from the Internet. The data structures are preferably stored in any convenient location accessible by the monitoring process. Typically, the invention is implemented on a user's client machine. Based on the information retrieved, one or more actions may be specified and then taken (on the client machine or elsewhere, depending on the action defined). This architecture provides a robust and convenient mechanism for enabling the user to extract and then act upon specific data.

The basic algorithm for the background monitoring process typically runs on a server and is summarized as follows:

1. Read in the defined data sources and action criteria; and
2. Loop on all the action criteria;
   Based on the polling interval associated with each action criteria, spin off a worker thread.

These steps are illustrated in more detail in the flowchart of FIG. 4.

Then, for each worker thread:

1. Retrieve the contents (e.g., a Web page or some portion thereof) of the data source location (e.g., a URL) associated with the action criteria;
2. Determine if the data source is valid by checking the recognition criteria against the data source contents;
3. If the data source is valid, determine if the action defined for the data source is triggered by checking the sensitivity criteria against the data source contents; and
4. If the data source contents match the sensitivity criteria, trigger the action as defined by the action type and parameters.

Figure 5:
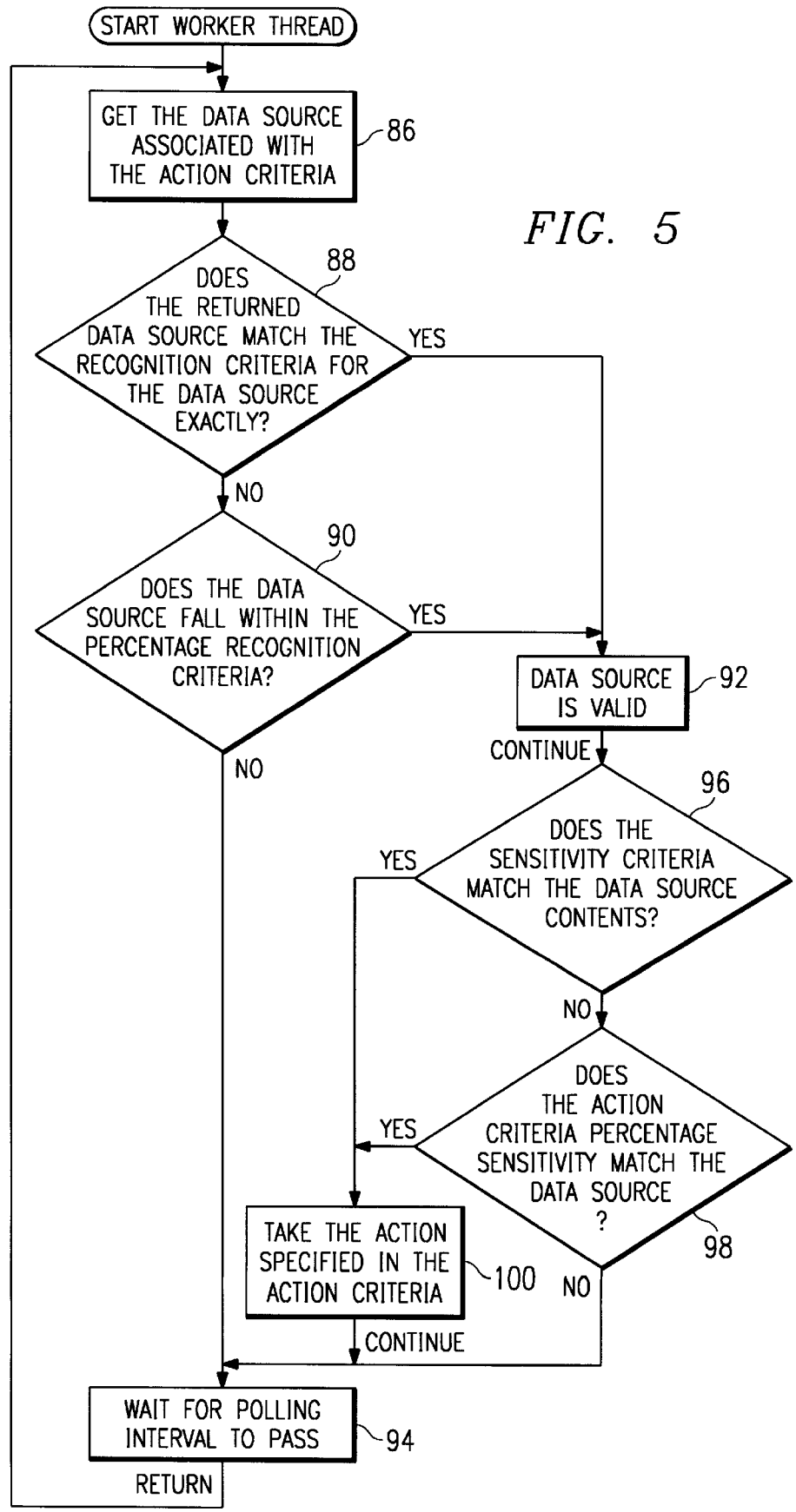
FIG. 5 is a flowchart illustrating the processing of each worker thread generated by the process of FIG. 4.

These steps are illustrated in more detail in the flowchart of FIG. 5.

The inventive process may include various optimization techniques, such as caching the contents of a data source for multiple action criterias that have the same polling interval and data source. The action criteria definition may also be expanded so that it does not trigger to an action if the action were already triggered in the last 24 hours, for example. Alternatively, the action criteria could simply match the contents of the data source to a previously stored version of the data source and determine if an action should be triggered based on changes between the two contents. All such variations, of course, are within the scope of this invention.

FIG. 4 is the flowchart illustrating the inventive method for spinning off the worker threads that recognize and act upon the user-specified dynamic data. The routine assumes the definition of several values including data.x=an array of data sources (in the preferred embodiment, a list of URLs), action.x=an array of action criteria, and data.action.i=an association of the action criteria array with a particular data source. The routine begins at step 50 by setting a variable i=0. At step 52, a test is performed to determine if data source definitions exist. If not, the routine halts. If data source definitions exist, the routine continues at step 54 by setting i=i+1. The routine then reads the data source definition into the data.i array entry at step 56. At step 58, the variable j is set to j=0. A test is then performed at step 60 to determine if action criteria definitions exist for this data source. If not, the routine continues to check for more data source definitions at step 72. In this case, the data source will be passed by the background process since the data source does not have any action criteria associated with it. If, however, the outcome of the test at step 60 is positive, the routine continues at step 64 by setting j=j+1.

At step 66, the routine reads the action criteria in array action.j. A test is then performed at step 68 to determine if there are any more action criteria for the data source. If the outcome of the test at step 68 is positive, the routine returns to step 64 and increments j. If, however, the outcome of the test at step 68 indicates that there are no more action criteria for the data source, the routine branches to step 70 to relate the action criteria to the data source. This is data.action.i as described above. The routine then continues at step 72 to test whether there are more data source definitions. If so, the routine returns to step 54 and increments i. The processing loop is then repeated. If, however, the outcome of the test at step 72 indicates that there are no more data source definitions, the routine branches to step 74.

At step 74, for i=to data sources, the routine increments i. At step 76, for j=to action criteria, the routine increments j. The routine then continues at step 78 to create a worker thread as described below in the flowchart in FIG. 5. When control returns from step 78, the routine continues at step 80 to test whether more action criteria exist. If the outcome of the test at step 80 is positive, the routine returns to step 76 and increments j. If, however, the outcome of the test at step 80 indicates that no more action criteria exist, the routine continues at step 82 to test whether any more data sources exist. If so, the routine returns to step 74 to increment i. If, however, the outcome of the test at step 82 indicates that no more data sources exist, the routine branches to step 84 to wait until the program terminates. This completes the main processing routine.

FIG. 5 illustrates the processing for each worker thread. This is step 78 in FIG. 4 as described above. The processing begins at step 86 by obtaining the data source associated with the action criteria. At step 88, a test is performed to determine whether the returned data source matches the recognition criteria for the data source exactly. If the outcome of the test is negative, the routine continues at step 90 to test whether the data source falls within the percentage recognition criteria. If either the outcome of the test at step 88 or the test at step 90 is positive, the data source is valid as indicated at step 92. If, however, the outcome of the test at step 90 indicates that the data source does not fall within the percentage recognition criteria, the routine branches to step 94 to wait for a polling interval to pass. When the interval has passed, control returns to step 86 in the outermost loop.

If the data source is valid, the routine performs a test at step 96 to determine whether the action sensitivity criteria matches the data source contents. If not, the routine branches to perform a test at step 98 to determine whether the action criteria percentage sensitivity matches the data source. If the outcome of the test at step 98 is negative, the routine again branches to step 94 to wait for a polling interval to pass. If, however, the outcome of either the test at step 96 or the test at step 98 is positive, the routine branches to step 100 to take the specified action in the action criteria. Control then returns to step 94, which then returns to step 86. This completes the processing for the worker thread. At step 94, the thread will wait for its polling interval (as defined by its action criteria) to pass before it retrieves the data source again at step 86. Multiple worker threads are typically processed in parallel in this manner. When all worker threads have terminated, control returns to step 78 in FIG. 4.

There are numerous potential applications of the present invention. Several applications are now described, but merely for exemplary purposes. These applications are not to be construed to limit the present invention.

Figure 6:
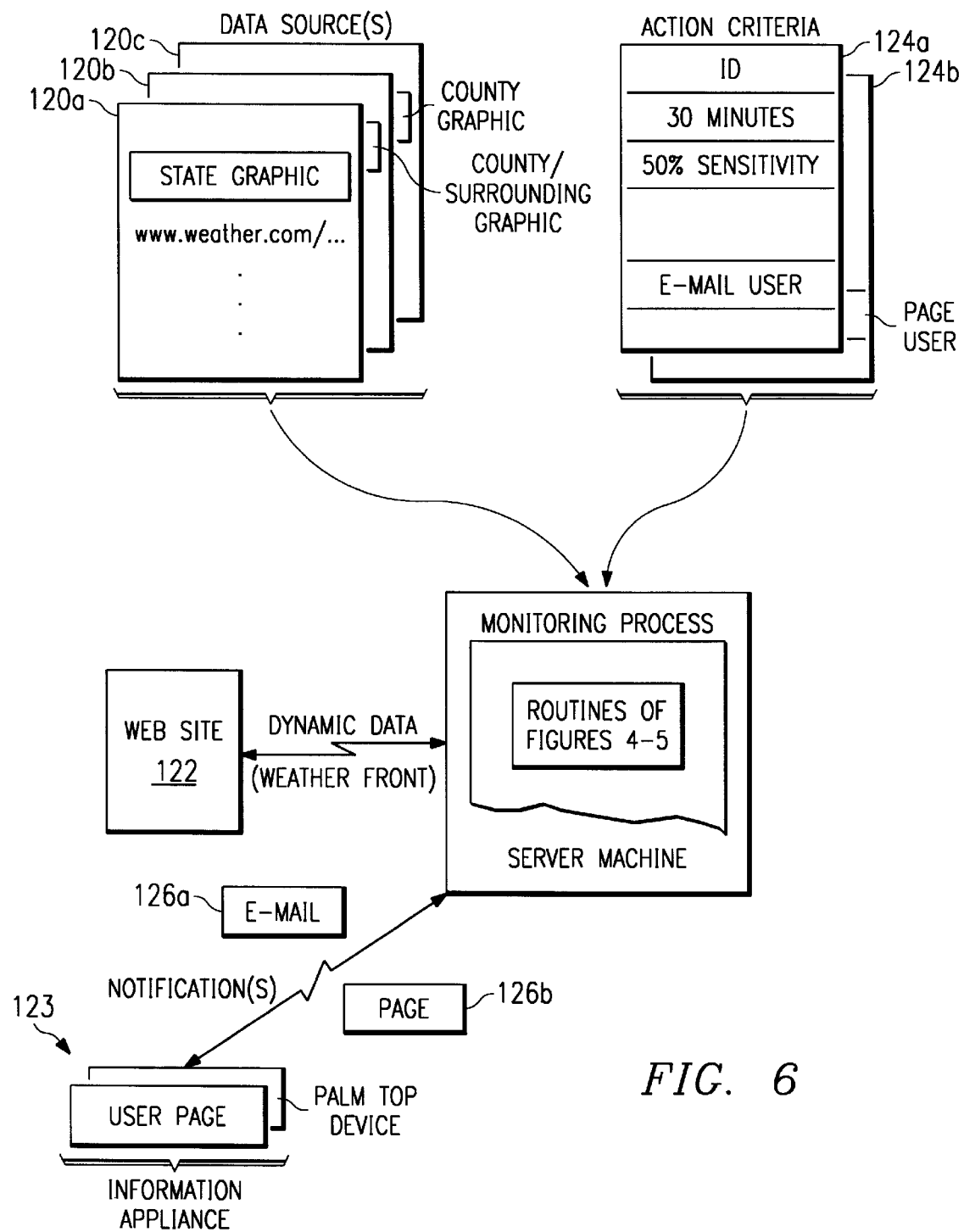
FIG. 6 is a schematic representation of a particular application of the present invention.

FIG. 6 illustrates use of the inventive technique and system to warn a particular user (e.g., a farmer or an agent thereof) of adverse weather conditions moving into a particular geographic area of interest. For illustrative purposes, the user is interested in weather conditions in his particular county, but also in each surrounding county and, perhaps, the State generally. Thus, the user might take a first given action if a storm system is approaching but has not reached his particular country, and then a second given action if and when the storm moves into his country.

Thus, continuing with this example, the user or his agent (using a GUI described below) defines three (3) data sources 120, each a graphic device with a different scale. The first graphic 120a covers the entire state in which the farmer lived. The second graphic 120b covers the county the farmer lives and all surrounding counties. The third graphic 120c covers just the county in which the farmer lives. Each graphic presumably resides at the same URL (for example, www.weather.com/ . . . ) identified as Web site 122. If desired or necessary, the provider of the graphic on the Internet might switch out different geographic scales depending on the amount of weather activity in a particular region. For example, if there are no storms in the county or surrounding counties, the provider could just post the state graphic 120c at the site 122.

It is assumed that the farmer has some information appliance 123 available to him. Thus, for example, the information appliance may be a wireless, battery-powered palmtop computer that the user may carry on his person, even in the field. The monitoring process executes on this computer. Alternatively, the user carries a simple paging device, or wireless telephone, to receive notification(s) resulting from the triggering of some action(s) by the monitoring process running, for example, on a PC at the farmer's house.

As described above, each data source may have a recognition criteria associated therewith. Thus, in this example, the recognition criteria is a pixel outline of the state, surrounding counties, and current county (as the case may be). These values thus indicate to the background process which geographic image was retrieved from the URL.

As also described, each data source may have a set of one or more action criteria associated therewith. In this example, the user is interested if a weather system is moving into one of the surrounding counties and especially interested if the weather system moves into the farmer's current county. Thus, two action criteria 124a and 124b are defined for the corresponding graphics 120b and 120c. A third action criteria might be defined to correspond to the state graphic 120a to log information to a file.

Each action criteria includes a polling criteria (30 minutes), a sensitivity criteria (e.g., green pixels to indicate rain), a percentage sensitivity (e.g., 50%), and a given action. A first action for the surrounding counties graphic 120b is to send an e-mail 126a to the farmer's laptop or palmtop computer (assuming the application is running somewhere else in this case). This is an example of a remote notification capability that is quite useful in the event the farmer is located remotely (e.g., out standing in his field) and not accessible to a computer on which the application is running. Thus, the routine would poll the data source every 30 minutes and have a sensitivity criteria of certain colored pixels, such as green to indicate rain, in a defined area. The percentage sensitivity helps indicate to the background process if it is important to notify the farmer if 50% (or some other percentage of the sensitivity area) was covered with rain.

Another action 126b, associated with the second action criteria, pages the farmer on the farmer's messaging pager. It has a similar definition to the first action criteria, except that the sensitivity criteria is different. In the first action criteria, a county region is defined; in the second action criteria, a weather system over a single county region is defined.

When the background process runs (typically at the client), it follows the algorithm defined earlier, checking the two data sources every thirty minutes (the polling interval). If there is 50% more of coverage of the weather system in the surrounding county, the farmer gets an e-mail message to peruse while inspecting the crops. If the weather system moves into the county, however, the farmer gets a page and can then take appropriate action. In either case, if the application is running on the computer in the farmer's possession, the action may be a simple audible warning or a voice-synthesized message communicating the changing weather conditions.

Figure 7:
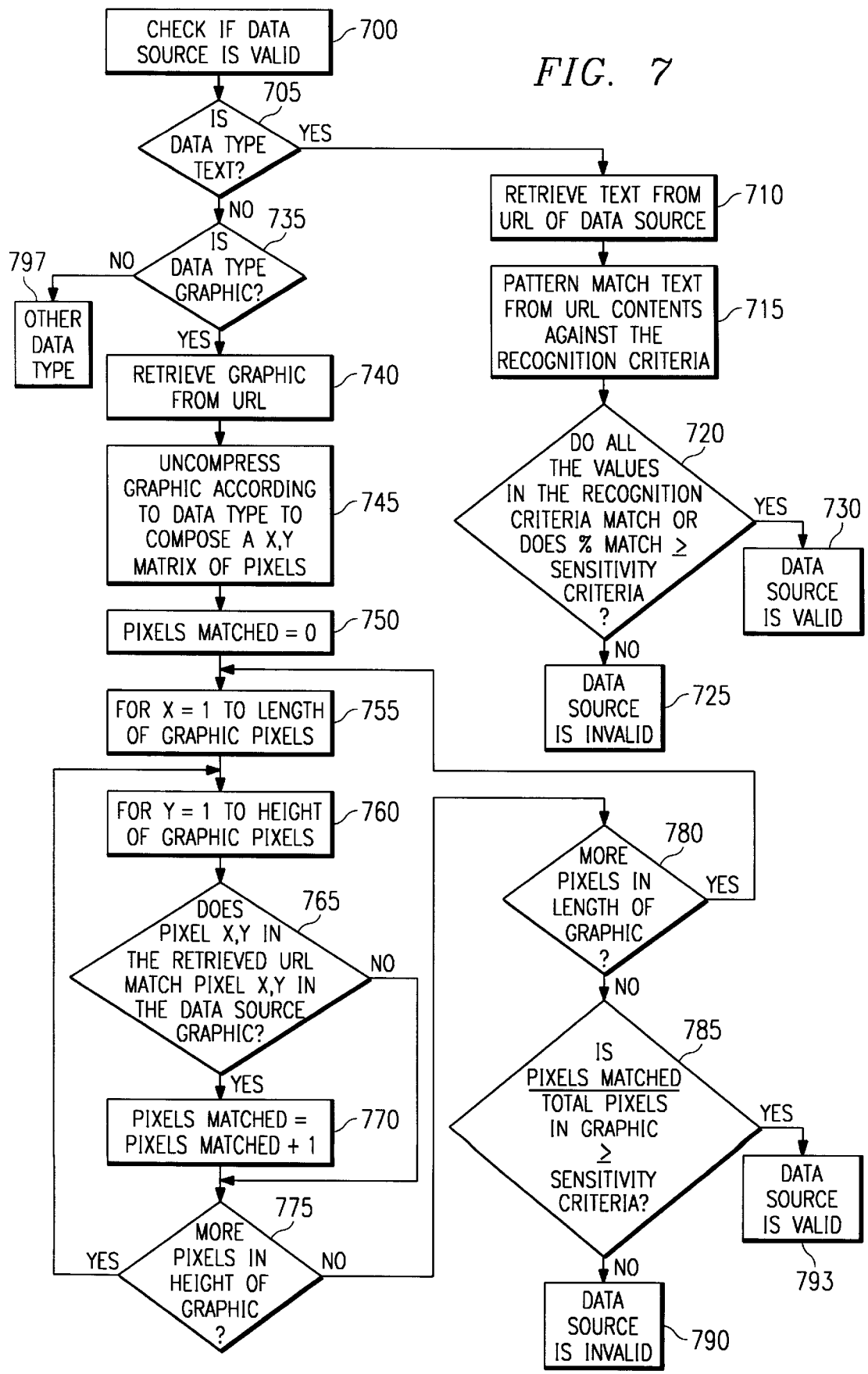
FIG. 7 is a detailed flowchart illustrating a preferred routine for checking whether a particular data source is valid.

FIG. 7 is a more detailed flowchart illustrating how the inventive process checks if a data source is valid. The algorithm begins at step 700 and flows to step 705 where the data type of the data source is checked to determine if it is a text type (or a text derivative such as, but not limited to, HTML). If the data type is a text type, the routine branches to step 710. If the data type is not a text type, the routine branches to step 735.

At step 710, the background process retrieves the text contents from the data source location at the specified URL. Process flow then continues at step 715, where a traditional pattern matching technique preferably is used to match text from the URL contents against the recognition criteria for the data source. At step 720, the process checks to see if all the values in the recognition criteria match or if the percentage of values (that do match) is greater than or equal to the percentage sensitivity criteria. If step 720 is not true, process flow continues to step 725, where the data source is considered invalid. If step 720 is true, the routine continues to step 730 where the data source is determined to be valid.

At step 735, the data type of the data source is checked to determine if it is a graphic type (or a graphic derivative such as, but not limited to, .gif or .jpeg). If the data type is graphic, the process moves to step 740. If the data type is not graphic, flow continues to step 797 where the data type is determined to be not text or graphic. At step 797, the invention checks for other data types, such as video or sound, depending on the MIME types implemented.

At step 740, the background process retrieves the text contents from the data source location at the specified URL. Flow continues to step 745, where the graphic is uncompressed according to the data type specifications (such as .jpeg) to compose a (x,y) matrix of pixels. The routine then continues to step 750, where a pixels matched variable is set to 0. Thereafter, the routine continues to step 755, where variable x is set to 1. This variable is incremented to the height number of graphic pixels. Next, step 765 checks to see if the pixel (x,y) in the retrieved URL matches pixel (x,y) in the data source graphic. The matching algorithm preferably checks for general shades of color and hue. If step 765 is true, flow continues to step 770. If, however, step 765 is not true, flow continues to step 775.

At step 770, the pixels matched variable is incremented by 1. The routine then continues to step 775, where the algorithm determines if there are more pixels in the height of the graphic. If step 775 is true, flow continues to step 760. If, however, step 775 is not true, variable y is reset to 0 and flow continues to step 780. At step 780, the algorithm determines if there are more pixels in the length of the graphic. If step 780 is true, flow continues to step 775. If, however, step 780 is not true, the routine continues to step 785, where the pixels matched variable divided by the total number of pixels in the graphic is checked to see if it is greater than or equal to the sensitivity or percentage criteria in the data source. If step 785 is not true, the routine continues to step 790 where the data source is considered invalid. If, however, step 785 is not true, flow continues to step 790 where the data source is considered invalid. If step 785 is true, flow continues to step 793 where the data source is determined to be valid. This completes the processing.

Figure 8:
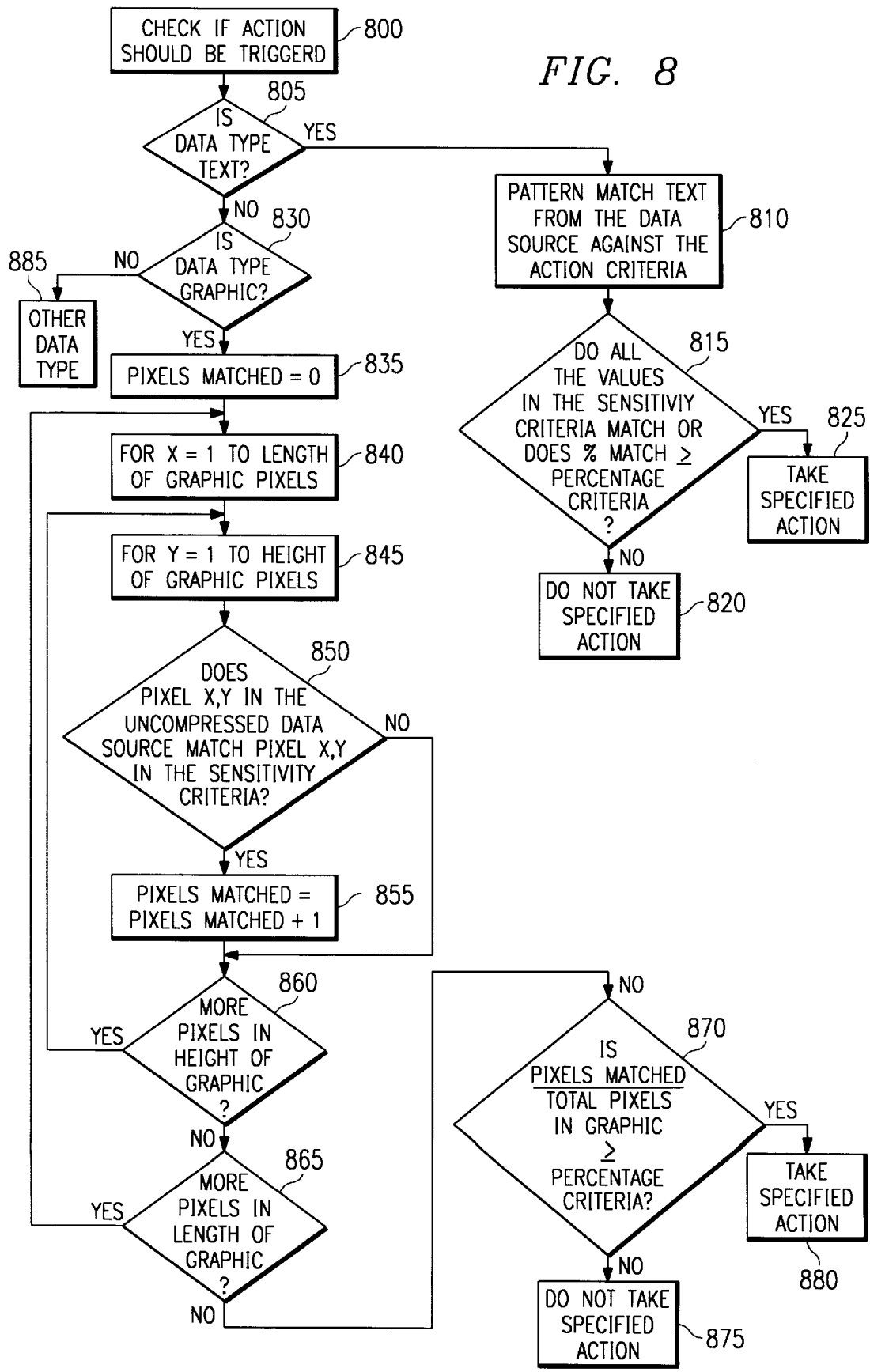
FIG. 8 is a detailed flowchart illustrating if an action should be triggered for a data source.

FIG. 8 is a flowchart illustrating how the inventive process checks if an action should be triggered for a data source. The algorithm begins at step 800 and flows to step 805 where the data type of the data source is checked to determine if it text (or a text derivative, such as, but not limited to, HTML). If the data type is text, flow moves to step 810. If the data type is not text, the routine continues to step 830.

At step 810, the inventive process preferably uses a traditional pattern matching technique to match text from the URL contents against the recognition criteria for the data source. At step 815, the process checks to see if all the values in the sensitivity criteria match or if the percentage that does match is greater than or equal to the percentage criteria in the action criteria. If step 815 is not true, the process flow continues to step 820 and the action is not taken. If step 815 is true, however, the process flow continues to step 825 where the action is taken.

At step 830, the data type of the data source is checked to determine if it a graphic (or graphic derivative, such as, but not limited to, .gif or .jpeg). If the data type is graphic, flow moves to step 835. If the data type is not graphic, flow continues to step 885 where the data type is determined to be not text or graphic. At step 885, the invention checks and takes action for other data types, such as video or sound, depending on the MIME types supported.

At step 835, a pixels matched variable is set to 0. The routine then continues to step 840 where variable x is set to 1. This variable is incremented to the length number of graphic pixels. Flow continues to step 845, where variable y is set to 1. This variable is incremented to the height number of graphic pixels. Next, step 850 checks to see if the pixel (x,y) in the retrieved URL matches pixel (x,y) in a sensitivity criteria graphic. The matching algorithm preferably checks for general shades of color and hue. If step 850 is true, flow continues to step 855. If, however, step 850 is not true, flow continues to step 860.

At step 855, the pixels matched variable is incremented by 1. Flow continues to step 860, where the algorithm determines if there are more pixels in the height of the graphic. If step 860 is not true, variable y is reset to 0 and flow continues to step 865. At step 865, the algorithm determines if there are more pixels in the length of the graphic. If step 865 is true, flow continues to step 840. If, however, step 865 is not true, the routine continues to step 870 where the pixels matched variable divided by the total number of pixels in the graphic is checked to see if it is greater than or equal to the percentage criteria in the action criteria. If step 785 is not true, flow continues to step 790 and the action is not taken. If, however, step 785 is true, flow continues to step 793 where the action is taken. This completes the processing.

Figure 9:
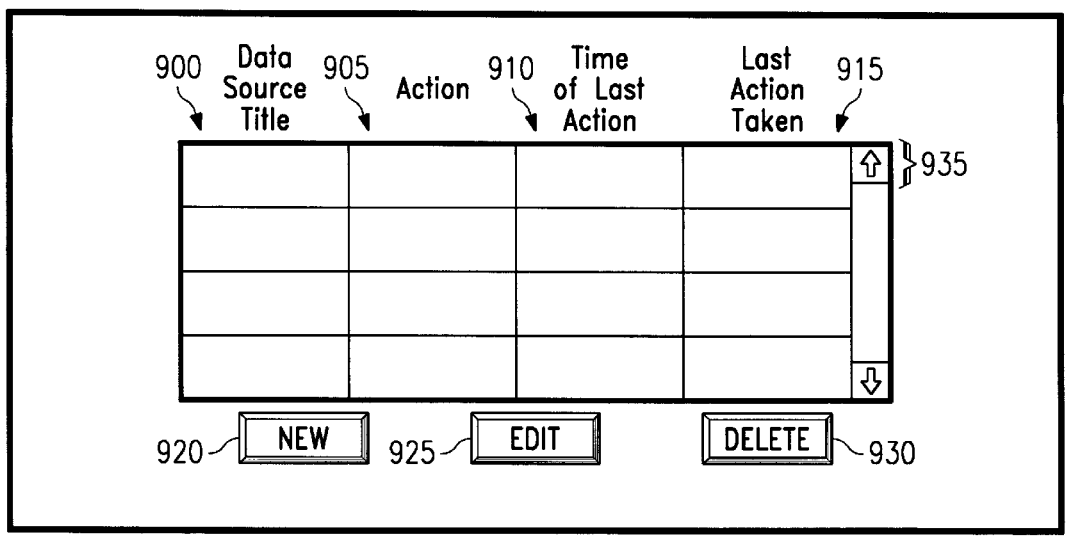
FIG. 9 is an illustrative user interface for use in displaying to the user a list of data sources and their associated action criteria.

FIG. 9 presents a representative user interface to display all the data sources and action criteria for the data source to the user. As noted above, preferably, this user interface is implemented on the client machine using a Java application or applet. The interface includes a data source title column 900 that shows the titles that the user has defined for the process. It includes an action criteria column 905 that shows the actions that user has defined for the data source in the row 935. As discussed above, there can be more than one action criteria for a data source, and in such cases, there will be one row for each data source and action criteria pair in the user interface. The Time of Last Action column 910 shows the last time the action criteria was checked by the background process. The Last Action Taken column 915 shows what action was taken when the action criteria was last checked.

The New button 920 allows the user to create a new data source, as well as action criteria definitions for the data source. The Edit button 925 allows the user to edit the data source in the row that is selected. When the Edit button is pressed, the user is taken to the Data Source Definition user interface in FIG. 10. The Delete button 930 allows the user to delete the data source and the corresponding action criteria in the row that is selected.

Figure 10:
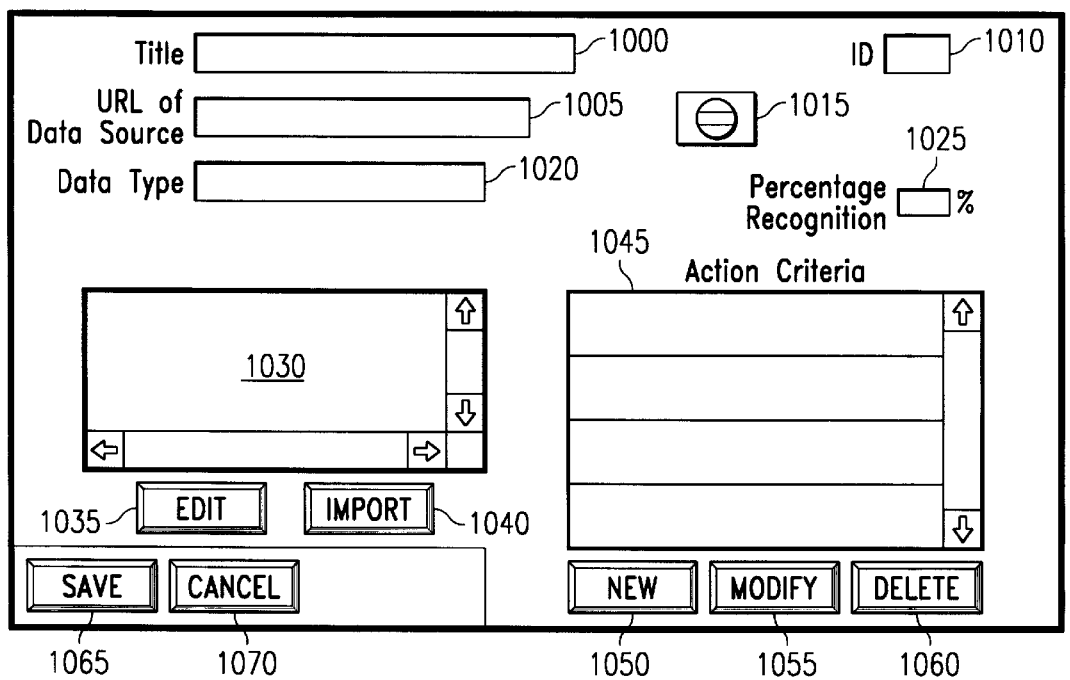
FIG. 10 is an illustrative user interface screen for enabling a user to define a data source definition.

FIG. 10 shows a preferred Data Source Definition user interface. The user can enter the title of the data source for future recognition purposes in field 1000. The invention will automatically assign a unique data source ID number in field 1010. The URL of the data source, such as a http or https site, can be entered by the user in field 1005. To view the current contents of the location, the user can press the Web browser button 1015 and the user interface will launch the user's default web browser with the specified URL.

The data type field 1020 is a drop down list of supported data types, such as plain text, HTML, .gif, and .jpeg. The percentage recognition field 1025 is a spin button list from 1 to 100 percent, allowing the user to specify how accurately the recognition criteria should match the retrieved data source contents. The recognition criteria data area 1030 varies according to data type. If the data type specified in 1020 is text, the recognition criteria data area will be a multi-line entry field. If the data type specified in 1020 is graphic, the recognition criteria data area will be a drawing area and the Edit button 1035 may be activated to allow simple editing functions (such as drawing or erasing pixels in the drawing area). When edited, the drawing area typically will be the same size as the data source. When presented in the interface, the drawing area may be scaled down. The Import button 1040 allows users to import a text file for a data type of text and a graphic file for a data type of graphic.

The action criteria list 1045 preferably shows the user all the action criterias defined for the data source. The new button 1050 allows users to create new action criteria for the data type. The modify button 1055 allows users to edit a selected action criteria in the action criteria list. When an action criteria entry is edited, the user may be navigated to the Action Criteria Definition user interface in FIG. 11. The delete button 1060 allows the user to deleted a selected action criteria from the action criteria list. The Save button 1065 allows the user to save the entire data source. The Cancel button 1070 allows the user to discard all changes. When either button is pressed, the user returns to FIG. 9.

Figure 11:
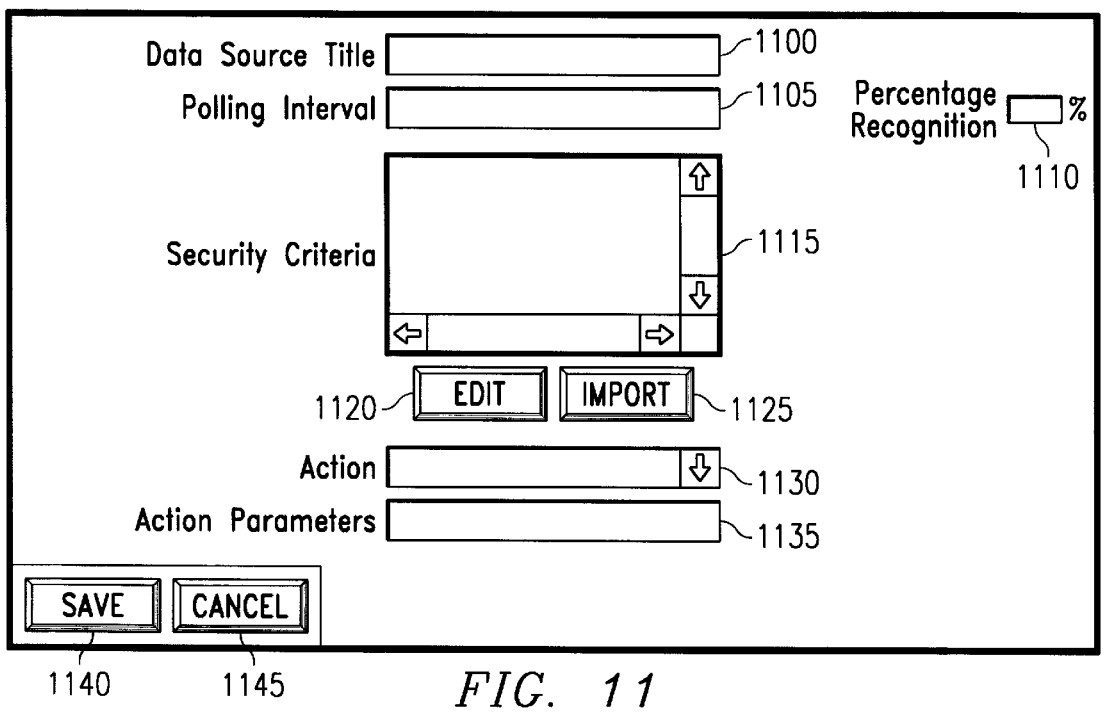
FIG. 11 is an illustrative user interface screen for enabling a user to define an action criteria.

FIG. 11 shows a preferred Action Criteria Definition user interface. The user is preferably presented with a read only display of the title of the data source 1100 to which the action criteria corresponds. The polling interval field 1105 allows the user to specify the interval in which the action criteria should be checked against the data source. The value preferably is specified in days, hours, minutes, and seconds. The percentage recognition field 1110 is a spin button list from 1 to 100 percent, allowing the user to specify how accurately the sensitivity criteria should match the retrieved data source contents.

The sensitivity criteria data area 1115 usually varies according to data type. If the data type specified for the data source in 1020 is of text, the sensitivity criteria data area will be a multi-line entry field. If the data type specified for the data source in 1020 is of graphic, the sensitivity criteria data area will be a drawing area and the Edit button 1120 may be activated to allow simple editing functions (such as drawing or erasing pixels in the drawing area). When edited, the drawing area typically will be the same size as the data source. When presented in the interface, the drawing area may be scaled down. The Import button 1125 allows a user to import a text file for a data type of text and a graphic file for a data type of graphic.

The Action drop down list 1125 allows the user to specify what action should be taken by the background process it the sensitivity matches the retrieved data source contents within the percentage recognition range. Actions include, but are not limited to, writing to a file, sending an e-mail or activating a pager. The Action Parameter entry field allows the user to specify what values to pass to the action, such as the filename, and what to write in the file for logging or the e-mail address and text to put in the e-mail for sending a message. The Save button 1140 allows the user to save the entire data source. The Cancel button 1145 allows the user to discard all changes. When either button is pressed, the user returns to FIG. 9.

As illustrated by the example previously described, there are a myriad of applications in which the present invention may be used. The dynamic data of interest may be a stock or commodity quote. Whether expert or novice, traders or brokers may be interested when a stock or commodity price changes. Traders can utilize the inventive architecture to define data sources (that are HTML pages) of the latest stock prices generated by a CGI script running on a Web server, which obtains the data from public markets. When a stock price goes up or down to a certain amount, the trader can define action criteria to place an on-line buy or sell order.

Still another example involves dynamic data such as "hot news" or breaking stories. In particular, reporters or researchers may be interested in the content of online is articles published from many different sources. In this application, a user defines data sources that correspond to Web servers that regularly publish articles or documents. The action criteria looks for individual, business, or place names, and then alerts the reporter that a document of interest exists. This technique obviates for the user to browse all available articles or to attempt to locate relevant information (e.g., using a search engine).

Yet another example involves financial transaction data. In particular, bank network administrators desire to detect changes in their online environment. Banks are increasingly using Web servers to allow customers to conduct online or so-called Internet banking transactions. The inventive architecture allows network administrators to monitor the status of the Web servers used in online banking. The data source would be a CGI script that reports on the status on whether a particular Web server is up or down and/or the number of transactions flowing through the Web server. In this example, the action criteria alerts the administrator if a Web server needs to be restarted, or if the configuration of the Web server should be automatically changed to allow more connections or service threads.

Another representative application is a Web-based business cash management method whereby a business interacts with a financial institution at which its accounts are located. In this example, the data source may be a particular business account into which customer checks are deposited and from which the business writes checks for payment. The particular data source would thus include URL information (e.g., identifying a https link) into the account and the appropriate recognition criteria. Given action criteria would define what action to take if the balance in the account reached a given value (e.g., $0) during a given polling interval (e.g., every 30 minutes). One particular action (e.g., a telephone inquiry) might be carried out if the action criteria were associated with a known or "good" customer, while another type of action (e.g., referral to a credit check) might be carried out if the action criteria were associated with a new or "risk" customer. The technique thus facilitates Web-based cash management in the account by having business personnel define the action criteria and then having the system automatically take certain actions with respect to the events that impact the account balance or some other given metric. The business could also use the technique to monitor if a check has cleared the system of if a particular deposit has been posted to the account.

Dynamic data may comprise simple graphical information for use in managing a computer system environment. Thus, the application may be used to monitor such graphical information, such as a bar graph of users accessing disk storage. If a particular bar exceeds a threshold, the background process could trigger an action, such as deleting all the core files from all directories. Still another example is a monitoring application, such as a system for monitoring video pictures from a video camera source. The background process could compare the contents of a polled picture against an original picture to see if there has been any activity within a sensitive area during a previous polling interval.

The invention may also be used to notify a particular user that a page (or some portion thereof) located at a URL no longer meets the recognition criteria specified.

The inventive architecture provides numerous advantages. As has been described, the architecture uses a simple process, such as a Java application, that runs in the background of a given machine that has access to the Internet. The process retrieves one or more data sources from the Internet, examines the data sources according to sensitivity criteria, and triggers actions if any of the sensitivity criteria are met. This background process acts like a sentry tower, scanning the Internet horizon for events of importance and taking action when events are spotted.

As noted above, the invention is preferably implemented as a standalone Java application, but this is not a requirement. The architecture could be implemented as a Java applet that runs in the user's Web browser, or as a program written in another language, such as C or C++.

The present invention presents a simple, yet quite capable, algorithm that works on the various dynamic data sources that are available on the Internet. The technique places the power of an active, not passive, agent in the hands of any user connected to the Internet.

This architecture works on dynamic graphical and textual data that is available on the Internet, but the principles are not limited to any particular format as other MIME types may be supported as previously described. When written in Java, the background process is well-suited for working through the Web, such as an applet through a Web browser. In addition, the cohesive framework provides for rapid and easy extendibility and adapts to variety of input sources.

Although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, although the present invention is described in the context of the Hypertext Markup Language (HTML), those of ordinary skill in the art will appreciate that the invention is applicable to alternative markup languages including, without limitation, SGML (Standard Generalized Markup Language) and XML (Extended Markup Language).

Having thus described my invention, what I claim as new and desire to secure by letters patent is set forth in the following claims.

What is claimed is:

1. A method, operative in a computer, for recognizing and acting upon dynamic data in a computer network having a plurality of Web servers, comprising the steps of:

having a user define at least one data source to include information identifying a location of a data object adapted to be displayed on a Web client using a browser, and a recognition criteria;

for the data source, having a user define a set of one or more action criteria, wherein each action criteria has a given polling interval and includes information identifying a sensitivity criteria, and an action to be taken if the sensitivity criteria for the data source is met;

at the polling interval for a given action criteria, using the recognition criteria to validate the data source by comparing the recognition criteria to contents of the data object; and if the data source is valid, taking the action if the sensitivity criteria for the data source is met.

2. The method as described in claim 1 wherein the action is selected from a group of actions consisting essentially of logging a message, sending an e-mail, transmitting a page, running a program and updating a database.

3. The method as described in claim 1 wherein the data source further includes a data source identifier and a type identifier.

4. The method as described in claim 1 wherein the data source further includes a percentage recognition criteria value for determining whether the recognition criteria is met.

5. The method as described in claim 1 wherein each action criteria includes a data source identifier that uniquely defines the data source with which the action criteria is associated.

6. The method as described in claim 1 wherein the action criteria further includes a percentage sensitivity value that determines whether the sensitivity criteria is met.

7. The method as described in claim 1 wherein the data source and the associated action criteria are defined by a user of a client machine.

8. The method as described in claim 1 wherein the location of the object is defined by a Uniform Resource Locator (URL).

9. The method as described in claim 1 further including the step of storing contents of the data source for multiple action criteria that have the same polling interval.

10. A method, operative in a computer, for recognizing and acting upon dynamic data in a computer network having a plurality of servers, comprising the steps of:

(a) having a user define a set of one or more data sources, each data source including information identifying a location of a data object, and a recognition criteria;

(b) for each data source, having a user define a set of one or more action criteria, wherein each action criteria has a given polling interval and includes information identifying a sensitivity criteria, and an action to be taken if the sensitivity criteria for the data source is met;

(c) at the polling interval for a given action criteria, using the recognition criteria to validate the data source associated with the given action criteria by comparing the recognition criteria to contents of the data object;

(d) if the data source is valid, taking its corresponding action if the sensitivity criteria for the data source is met; and (e) repeating steps (c)–(d) for each of the set of data sources.

11. The method as described in claim 10 wherein the action is selected from a group of actions consisting essentially of logging a message, sending an e-mail, transmitting a page, running a program and updating a database.

12. The method as described in claim 10 wherein each data source further includes a data source identifier and a type identifier.

13. The method as described in claim 10 wherein at least one data source further includes a percentage recognition criteria value for determining whether the recognition criteria is met.

14. The method as described in claim 10 wherein at each action criteria includes a data source identifier that uniquely defines the data source with which the action criteria is associated.

15. The method as described in claim 10 wherein at least one action criteria further includes a percentage sensitivity value that determines whether the sensitivity criteria is met.

16. The method as described in claim 10 wherein each data source and its associated set of action criteria are defined by a user of a client machine.

17. The method as described in claim 10 wherein the location of the object is defined by a Uniform Resource Locator (URL).

18. A computer program product in a computer-readable medium for use in recognizing and acting upon dynamic data in a computer network having a plurality of servers, wherein at least user-defined data source has a set of one or more user-defined action criteria associated therewith, each data source including information identifying a location of a data object, and a recognition criteria, and each action criteria having a given polling interval and including information identifying a sensitivity criteria, and an action to be taken if the sensitivity criteria for the data source is met, the computer program product comprising:

means, operative during the polling interval for a given action criteria, for using the recognition criteria to validate the data source by comparing the recognition criteria to contents of the data object; and means, responsive to a determination that the data source is valid, for taking the action if the sensitivity criteria for the data source is met.

19. The computer program product as described in claim 18 wherein the action is selected from a group of actions consisting essentially of logging a message, sending an e-mail, transmitting a page, running a program and updating a database.

20. A computer, comprising:

a processor;

an operating system;

a data storage storing at least one user-defined data source definition and at least one user-defined action criteria definition, the data source definition including information identifying a location of a data object, and a recognition criteria, and the action criteria definition having a given polling interval and including information identifying a sensitivity criteria, and an action to be taken if the sensitivity criteria for the data source is met; and a monitoring application for use in recognizing and acting upon dynamic data in a computer network having a plurality of servers, comprising:

means, operative during the polling interval for a given action criteria, for using the recognition criteria to validate the data source by comparing the recognition criteria to contents of the data object; and means, responsive to a determination that the data source is valid, for taking the action if the sensitivity criteria for the data source is met.

21. A method for managing a monetary value in an account using the Internet, the account located at a Web server having a URL, comprising the steps of:

having a user define a data source to include information identifying the URL, and a recognition criteria;

having a user define a set of one or more action criteria, wherein each action criteria has a given polling interval and includes information identifying a sensitivity criteria, and an action to be taken if the sensitivity criteria for the data source is met;

at the polling interval for a given action criteria, using the recognition criteria to validate the data source by comparing the recognition criteria to contents of the data object; and if the data source is valid, taking the action if the sensitivity criteria for the data source is met.

* * * * *